United States Patent Office 2,843,633
Patented July 15, 1958

2,843,633
PROCESS FOR THE PRODUCTION OF HYDROPEROXIDES

Giulio Natta and Enrico Beati, Milan, Italy, assignors to Montecatini, Società Generale per l'Industria Mineraria e Chimica, a corporation of Italy No Drawing. Application January 4, 1954
Serial No. 402,129

Claims priority, application Italy January 16, 1953

4 Claims. (Cl. 260—610)

This invention relates to an improved industrial process for the oxidation of hydrocarbons comprising a saturated paraffinic chain which has at least one tertiary carbon atom, and to the production of the respective peroxides. In particular, the invention relates to the oxidation of cumene and the production of the hydroperoxide thereof.

It is known that hydrocarbons with a tertiary carbon atom can react with molecular oxygen, resulting in the formation of the corresponding hydroperoxides. Thus, cumene hydroperoxide can be obtained from cumene.

The auto-oxidation of isopropylbenzene or cumene to hydroperoxide has been described by Hock and Lang (Ber. 1944, 77–B, 257), who oxidized the pure anhydrous hydrocarbon at 85° C. in the presence of ultraviolet rays according to the formula:

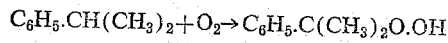

Various other processes for the production of hydroperoxide from cumene have been disclosed in the international patent literature since 1945.

In these processes, use is made of aqueous emulsions of cumene, or of cumene only, in the presence of a catalyst (such as ozone or a preformed hydroperoxide) and in the presence of small quantities of basic substances or sodium bicarbonate.

The reaction, as carried out by these conventional methods, is very slow so that reactors of considerable size are needed as well as long residence periods therein of the reaction products at the relatively high temperatures (80–120° C.), at which the reaction is effected.

Under the above conditions, there always occurs a partial and often detrimental decomposition of the hydroperoxide with an accompanying decrease in yield, particularly if the resulting cumene hydroperoxide is kept too long at the temperature at which it is formed.

In order to reduce the reaction time, it has been proposed to operate at higher temperatures (120°–130° C.) and to use gaseous mixtures richer in oxygen than air; but, under these conditions, the decomposition of the hydroperoxide takes place still more rapidly and it becomes necessary to stop the reaction when only a relatively small part of the cumene has been transformed.

Moreover, in order to obtain appreciable yields with these known processes, it is necessary to avoid or to limit the use of metallic materials for the surface areas of the reactor which come in contact with cumene, since metals exert an unfavorable influence upon the formation of the hydroperoxide and cause its decomposition. Besides, carefully purified cumene must be used.

It is an object of the present invention to minimize or obviate the above-mentioned deficiencies.

The invention is based on the discovery that the oxidation of the hydrocarbon with air or another gaseous mixture containing oxygen at a pressure of several atmospheres in the gaseous phase, is carried out much more efficiently by adding to the hydrocarbon small quantities of a primary alcohol, which forms a homogeneous solution with the hydrocarbon.

Among the primary alcohols, the best suited to this purpose has proved to be methanol. Its presence, e. g. in quantities corresponding to 5% by weight of the hydrocarbon, causes a significant increase in velocity of the reaction as compared to the oxidation without methanol, reduces or eliminates the adverse effect of the metallic reactor walls, permits a reduction in the operating temperature, or results in an increased yield at a shortened reaction time under the same temperature conditions. The method according to the invention further eliminates the need for catalysts (such as preformed hydroperoxides, ozone, etc.) and permits the use of non-purified cumene. Moreover, peroxides are obtained which have a higher degree of purity than those produced when operating without the use of methanol. Any pretreatment and refining procedure of the commercial cumene becomes unnecessary, although it was required in connection with the prior, conventional processes.

The effect of methanol on the chain reaction of the hydrocarbon oxidation to hydroperoxides was entirely unexpected and could not be predicted from theoretical considerations since so far very little had been known of oxidation chain reactions.

One feature, namely the reduction of the adverse effect of the metal reactor walls and the elimination of the decomposition of hydroperoxide caused thereby, can be attributed to the advantageous formation of adsorption films on the metal surfaces or to the formation of associations between hydrogen bonds of the hydroxyl group and the characteristic group of the hydroperoxides. On the other hand, the reason for the remarkable increase in the velocity of the oxidation reaction is not easily explained. The possibility has been suggested before of using a hydroperoxide as a catalyst either as such or dissolved in an inert solvent. Alcohol was mentioned in this connection, but the catalytic action of the alcohol itself had not been found. Moreover, it must be pointed out that the advantageous action of the alcohols, in particular of methanol, takes place only if present in small quantities (2–15%, preferably 3–6%). When operating at higher alcohol concentrations, no particular acceleration of the reaction is apparent.

The high vapor pressure of methanol allows operation at increased temperatures without any danger of explosion, as well as at higher total pressures and in the presence of gaseous mixtures containing more oxygen than would have been possible without methanol.

The presence of a relatively high methanol concentration in the vapor phase renders certain gaseous mixtures with cumene and oxygen non-explosive, which, in the absence of methanol, would be explosive at the same temperature and at the same partial oxygen pressure.

This allows to operate safely with air at pressures of several atmospheres and at temperatures above 90° C., and also with gaseous mixtures slightly richer in oxygen than air and thus causes a further increase in the velocity of reaction and, therefore, a speedier change of the cumene into its hydroperoxide. To avoid methanol losses in the residual gases, it is possible to scrub the latter with water and other solvents for methanol and to pass them through suitable adsorbents. Should low cost oxygen be available, it is convenient to recirculate air or gaseous mixtures containing such oxygen through the reactor and thus replace the oxygen of the gaseous mixture which has been used up in the oxidation of the hydrocarbon to hydroperoxide. Cumene losses due to evaporation are avoided in this manner and it is possible to obtain reaction conditions with well determined oxygen concentrations and partial pressures, which provide high overall yields, notwithstanding a limited reactor volume.

Several examples are given hereafter which are intended to illustrate, but not to limit, the present invention.

In the examples described, technical grade cumene is used, having a density of 0.864 at 18° C. and an average refractive index $n_D^{20} = 1.4916$. This product is obtained by alkylation of commercial grade benzene with propylene in the presence of aluminium chloride and separation of the homologues by means of rectification, without any other purification. Such cumene is not pure; actually, by further careful rectification, a forerun (2%) with $n_D^{20} = 1.4913$ and a tail fraction (8.5%) with $n_D^{20} = 1.4933$ can be separated therefrom.

A stainless steel (18% Cr and 8% Ni) autoclave with unpolished surface was used for all examples.

*Example 1*

A stainless steel autoclave having a capacity of 2,180 cc. is charged with 400 cc. of cumene and 25 cc. of methanol; after heating to 93° C., air is introduced so as to attain a pressure of 9.4 atm. Agitation is obtained by oscillating the autoclave over an arc of 30°, at a rate of 60 oscillations per minute.

When the pressure decreases to, say, 8.3 atm., oxygen is added so as to bring the pressure back to the initial 9.4 atm.; this operation is repeated until, after 420 minutes, 6.10 atm. of oxygen, corresponding to 8.0 liters, have been absorbed. The average velocity of absorption of oxygen is equal to 0.0145 atm. per minute. The liquid obtained at the end of the reaction contains 48 g. of hydroperoxide, which corresponds to a yield of about 90%, based on the oxygen consumed.

When operating under the same conditions, but adding at the beginning 15 g. of previously prepared cumene hydroperoxide, the oxygen absorption is 0.018 atm. per minute.

*Example 2*

The operation is carried out as in the preceding example, except that the temperature is raised to 110° C. while using 400 cc. of cumene free from cumene hydroperoxide, adding 25 cc. of methanol and increasing the air pressure to 12 atm. which, after a decrease to about 11 atm., is brought back to 12 atm. with oxygen.

The operation is continued until a total of 8.6 atm. of oxygen, corresponding to 10.8 liters at normal pressure, have been absorbed which takes about 3 hours, 35 minutes. This is equal to an average absorption velocity of 0.040 atm. per minute. 69.7 g. of hydroperoxide are contained in the liquid reaction product which corresponds to a yield of 95.5%, based on the quantity of oxygen absorbed.

Operating under the same conditions, but using 400 cc. of cumene containing 60 g. of preformed cumene hydroperoxide, leaves the velocity of oxygen absorption practically unchanged.

*Example 3*

The operation is carried out as in the preceding example, but at a temperature of 115° C., while air is fed to produce a pressure of 12 atm. When the pressure decreases to 11 atm., more oxygen is added to reach the initial 12 atm. Upon stopping the operation after 3 hours, 40 minutes, 12.1 atm. of oxygen, corresponding to 14.8 liters, have been absorbed.

The average absorption velocity in this case is 0.055 atm. per minute. The liquid reaction product contains 90 g. of hydroperoxide. The yield, based on the absorbed oxygen, is slightly less than 90%. The reaction velocity shows no substantial increase when preformed cumene hydroperoxide is added.

*Example 4*

The procedure of Example 3 is repeated, but at a temperature of 120°, while 20 cc. of methanol are added to the cumene instead of 25. Air is fed until the total pressure is 11 atm. When the pressure decreases to about 10 atm., it is brought back up to 11 atm. by the addition of oxygen. The operation is stopped after 1 hour, 50 minutes, when 9.46 atm. of oxygen corresponding to 11.5 normal liters have been absorbed.

The average velocity of absorption is 0.086 atm./min.

The liquid product obtained contains 73.6 g. of hydroperoxide which corresponds to a yield of 95%, based on the oxygen consumed.

*Example 5*

The operation is carried out as in Example 2, that is at an operating temperature of 110° C., but in addition to 400 cc. of cumene, only 20 cc. of methanol are introduced into the reactor and air is blown in until a total pressure of 10 atm. is reached.

Oxygen is added every time the pressure falls to 9 atm., until a pressure of 10 atm. is restored. After 4 hours, 53 minutes of operation, 9.4 atm. of oxygen, corresponding to 11.8 liters, have been absorbed. The velocity of oxygen absorption averages 0.032 atm./min. In the liquid reaction product, 78.5 g. of hydroperoxide are found, corresponding to a yield which is slightly lower than the theoretical yield.

From the reaction product, methanol is separated by rectification and, after addition of water, an azeotropic mixture of cumene and water is also separated by means of rectification. The greater part of the hydroperoxide is thus obtained at a purity of 93%. Under the same reaction conditions, but using cumene containing 10 g. of preformed hydroperoxide, the absorption velocity rises to 0.035 atm./min.

*Example 6*

The operation is carried out as in Example 5 at 110° C., but only 15 cc. of methanol are introduced instead of 20.

Air is added to the autoclave so as to reach a pressure of 10 atm. and oxygen is fed upon a pressure drop to about 9 atm. The operation is stopped after 5 hours, 20 minutes, when 9.6 atm. of oxygen, corresponding to 12 liters, have been absorbed.

The absorption velocity averages 0.030 atm./min. The liquid reaction product contains 75.4 g. of hydroperoxide, corresponding to a yield of 93%, based on the oxygen consumed. Under the same conditions, but employing 400 cc. of cumene containing 10 g. of preformed hydroperoxide, the absorption velocity rises to 0.041 atm./min.

*Example 7*

The operation is carried out as in Example 6, but 10 cc. of methanol are used instead of 15 cc. The temperature is maintained at 110° C., and maximum pressure at 10 atm.

The operation is discontinued after 6 hours, 35 minutes, after an absorption of 9.5 atm. of oxygen, corresponding to 12 liters. The absorption velocity appears to be much higher with the last feeds (0.05 atm./min.).

The liquid reaction product contains 78 g. of cumene hydroperoxide. The yield, based on oxygen, is slightly lower than the theoretical value. After separation of the methanol and of the unreacted cumene by means of azeotropic distillation with water, a 98% pure hydroperoxide is obtained. Employing cumene containing preformed cumene hydroperoxide (20 g. in 400 cc. of the mixture), the velocity of reaction rate increases to 0.041 atm./min.

*Example 8*

The operation is identical with that of Examples 5, 6 and 7 (temperature 110° C., pressure 10 atm.) but without the addition of methanol. The reaction proves to be much slower than in the preceding examples.

The average velocity of oxygen absorption is 0.005 atm./min. (i. e. 6.4 times lower than in Example 5, where 5% by volume of methanol, based on cumene, was present). After 6 hours, 30 minutes, only 1.65 of oxygen has been absorbed and the reaction product contains only 4.8% of cumene hydroperoxide.

*Example 9*

The experimental conditions are the same as in Example 4, but no methanol is added to the cumene. The velocity of oxygen absorption appears to be much slower and, upon stopping the operation after an absorption of 5.21 atm. of oxygen, corresponding to 6.36 liters, within a period of 7 hours, 9 minutes, which is equivalent to an average velocity of 0.01215 atm./min., the liquid reaction product is found to contain 41 g. of hydroperoxide, which represents a yield of 95%, based on the oxygen consumed.

*Example 10*

The procedure is identical to that of Example 9, but the reaction is carried out in the presence of 10.59 g. of hydroperoxide as a catalyst. Under these conditions, a small increase in the velocity of absorption of oxygen can be observed. The operation is stopped after the absorption of 6.73 atm. of oxygen, corresponding to 8.23 liters, during a period of 7 hours, 30 minutes, which is equivalent to an average absorption velocity of 0.015 atm./min. Thus, due to the presence of the cumene hydroperoxide at the start, the reaction speed seems to be somewhat increased over that in Example 9, but the yield, based on oxygen, is down to 78%; the liquid reaction product containing only 43.41 g. of hydroperoxide.

*Example 11*

The operation conditions are the same as in Example 8, but the reaction is carried out in the presence of 10.51 g. of cumene hydroperoxide as a catalyst.

As in Example 10, the reaction speed is increased by the effect of the initial presence of hydroperoxide. The operation is stopped after 3.23 atm. or 4.05 liters of oxygen have been absorbed, during a period of 7 hours, 55 minutes, which is equal to a velocity of 0.0071 atm./min.

The liquid reaction product contains 23 g. of hydroperoxide and the yield, based on oxygen consumption, amounts to 84%.

From the examples hereinbefore described, it is evident that the reaction velocity is substantially higher when carrying out the operation in the presence of alcohol, that the obtained product is of greater purity and that the efficiency of the process has been greatly improved. Moreover, special precautions with respect to the reactor lining are no longer required and the danger of explosions has been eliminated.

It is obvious that variations of the foregoing examples may be made without departing from the scope of the present invention.

We claim:

1. The process of preparing cumene hydroperoxide from cumene, which comprises admixing with cumene an amount of methanol equal to 2.5 to 6.25% by volume of the amount of cumene, heating the mixture in an enclosed vessel under a gaseous phase comprising molecular oxygen, and maintaining said vessel for the duration of the process at a temperature between 90 and 120° C. and at a pressure between 8 and 15 atmospheres.

2. The process according to claim 1, wherein said enclosed vessel is lined with stainless steel.

3. The process of preparing cumene hydroperoxide from cumene, which comprises admixing with technical grade cumene an amount of methanol equal to 5% by volume of the amount of cumene, heating the mixture in an enclosed vessel to a temperature of 120° C., introducing air until a pressure of 10 to 11 atmospheres is attained, oscillating said enclosed vessel to agitate and mix the content thereof, and maintaining said vessel for the duration of the process at said temperature of 120° C. and at said pressure of 10 to 11 atmospheres by periodical addition of oxygen.

4. The process of preparing cumene hydroperoxide from cumene, which comprises admixing with cumene an amount of methanol equal to 2.5% by volume of the amount of cumene, heating the mixture in an enclosed vessel to a temperature of 110° C., introducing air until a pressure of 10 atmospheres is attained, oscillating said enclosed vessel to agitate and mix the content thereof, maintaining said vessel for the duration of the process at said temperature of 110° C., and adding oxygen upon a pressure drop of 1 atmosphere to restore the original pressure of 10 atmospheres.

References Cited in the file of this patent

Frank: Chemical Reviews, vol. 46 (pages 155–169, February 1950), pages 157–159 applied.